United States Patent

Martini et al.

[11] Patent Number: 6,100,533
[45] Date of Patent: Aug. 8, 2000

[54] THREE-AXIS ASYMMETRIC RADIATION DETECTOR SYSTEM

[75] Inventors: Mario Pierangelo Martini; Dale A. Gedcke; Thomas W. Raudorf, all of Oak Ridge; Pat Sangsingkeow, Knoxville, all of Tenn.

[73] Assignee: EG&G Instruments, Inc., Oak Ridge, Tenn.

[21] Appl. No.: 09/076,296

[22] Filed: May 11, 1998

Related U.S. Application Data

[63] Continuation-in-part of application No. 08/824,514, Mar. 26, 1997, Pat. No. 5,777,333.
[51] Int. Cl.[7] .................................................. H01L 29/06
[52] U.S. Cl. ...................... 250/370.01; 257/618; 257/689
[58] Field of Search ...................... 250/370.01; 257/618, 257/689

[56] References Cited

U.S. PATENT DOCUMENTS

3,925,802  12/1975  Watanabe et al. ...................... 257/618
5,777,333   7/1998  Martini et al. ...................... 250/370.01

*Primary Examiner*—Constantine Hannaher
*Assistant Examiner*—Andrew Israel
*Attorney, Agent, or Firm*—Iandioria & Teska

[57] ABSTRACT

A three-axis radiation detection system whose inner and outer electrodes are shaped and positioned so that the shortest path between any point on the inner electrode and the outer electrode is a different length whereby the rise time of a pulse derived from a detected radiation event can uniquely define the azimuthal and radial position of that event, and the outer electrode is divided into a plurality of segments in the longitudinal axial direction for locating the axial location of a radiation detection event occurring in the diode.

48 Claims, 8 Drawing Sheets

FIG. 6
Input (a)

FIG. 7
Delayed (b)

FIG. 8
Subtracted (a-b)

THREE-AXIS ASYMMETRIC RADIATION DETECTOR SYSTEM

RELATED CASE

This application is a continuation-in-part of U.S. Ser. No. 08/824,514 filed Mar. 26, 1997, "Asymmetric Radiation Detector System," by Martini et al, now U.S. Pat. No. 5,777,333.

FIELD OF INVENTION

This invention relates to a three-axis asymmetric radiation detection system which locates the azimuthal, axial, and radial position of a radiation detection event.

BACKGROUND OF INVENTION

High-purity germanium (HPGe) detectors (see G. F. Knoll, *Radiation Detectors and Measurements,* Wiley 1989, Chapters 2, 4, 11 and 12) are frequently used in energy spectroscopy and related fields to detect gamma rays or other high-energy photons. These detectors essentially consist of a large germanium diode made from germanium which is very highly purified, and lightly doped. The germanium crystal is machined in a desired shape, such as planar or coaxial. Electrodes are applied to opposing contacts of the detector, one of which is rectifying electrode formed of p+ or n+ species, depending on the doping of the bulk germanium. A reverse-bias voltage is applied to the electrodes. The voltage is sufficiently high to cause all of the volume of the germanium to be depleted of charge carriers (i.e., under an electric field). Gamma rays impinging upon the detector will collide with the germanium atoms, causing hole-electron carrier pairs to be created. These holes and electrons are collected by the electrodes. The total charge collected by the electrodes is related to the energy of the detected photons.

The energy resolution of these detectors as gamma ray spectrometers is extremely good. For example, for gamma rays of 1 MeV of energy, the energy resolution, measured as the full width half maximum of the gaussian peak generated by the detector-electronics system, is better than two parts per thousand. Also, these detectors are now available in very large size (cylinders of 8 cm diameter by 8 cm length) and have, therefore, a high gamma detection efficiency.

Therefore, notwithstanding the high price and the inconvenience of cooling the detectors at liquid nitrogen temperature, they are the detector of choice in nuclear structure studies. Such studies are nowadays conducted with large arrays ("Gammasphere" at LBL-USA, "Euroball" at Legnato-Italy) where 100 or more detectors are mounted in a spherical structure. Also "Miniballs" (40–60 detectors) are in a project phase. In such experiments, the target, at the center of the sphere, is bombarded with fast heavy ions. The resulting gamma rays provide the information sought by the scientists. However, the nuclei recoil while emitting gammas which causes the emitted gamma energy lines to be broadened by Doppler shift. The only way to mitigate the imprecision caused by the Doppler shift is to correct the spectra by identifying where in the detector the event takes place. This also adds the benefit of complete tracking of the gamma rays inside the detector, thus distinguishing between multiple interactions of a single hit and multiple hits (see *Nuclear Instruments and Methods in Physics Research* A371 (1996), 489–496).

One modification proposed and tried for obtaining position information is "segmentation", i.e., dividing the outer and/or the inner contact in two or more conducting surfaces electrically insulated from each other by thin separation lines. For example, 60 of the 110 detectors in the Gammasphere are twofold segmented, i.e., the outer contact of the detector is divided in two electrically insulated halves. Signals are obtained both from the central contact (total energy) and the side contacts (position). In order to further improve position resolution, multiple segmentation (for example, the LBL "GRETA" project with 32 segments) is being proposed.

It should be noted that, while segmentation certainly works, it adds a large cost to the system because it is more difficult to make a segmented detector and also, every segmented channel needs a complete line of electronics. Moreover, segmented detectors are inherently less reliable.

It is well known that gamma rays interact with Ge in a complex way, often resulting in multiple interactions.

This would seem to make pulse shape analysis difficult or even impossible. However, in practice, three factors intervene which vastly improve the viability of pulse shape analysis as a position measuring tool. As the energy increases the scattering cross-section becomes more and more peaked in the forward direction. When the scattering angle is large, most of the energy is deposited in the first interaction. At low energies the photoelectric effect (one interaction) prevails. Because of these factors it appears that, notwithstanding the existence of multiple scattering, such scattering decreases the precision of the measurement, but does not substantially impair the viability of signal pulse shape analysis as a position-measuring tool.

High purity germanium detectors are used for precision measurements of gamma-ray energy. In many applications it is also useful to know the point or points of interaction of the gamma-ray photon in the germanium detector. This is often accomplished by separating the electrodes into separate segments and noting which segments collect charge from the photon interaction.

The patent application Asymmetric Radiation Detector System, by Martini, Gedcke, Raudorf and Sangsingkeow, filed Mar. 26, 1997, Ser. No. 08/824,514, of which this is a continuation-in-part, describes a method of obtaining azimuthal and radial position information without such segmentation or with only a minimal amount of segmentation. Martini et al. show that by introducing a degree of asymmetry to the electrodes and analyzing the rise time of the detector signal, position information can be obtained in a plane generally perpendicular to the axis of the detector.

If the photon has energy above a few hundred keV, it will usually interact with the germanium crystal at several points before losing all its energy. The interactions are physically well separated in the crystal, with an average separation distance of about one centimeter. The interactions occur at essentially one point in time, since the photon is moving at the speed of light and the detector dimensions are relatively small. The method of Martini et al. measures the energy-weighted average azimuthal and radial position of the interactions.

There are cases in which it is useful to know the total number of interactions and their position in the detector. For example, in the "crystal ball" detector systems used in physics research, the scientists would like to track each photon interaction through the detector system. Such tracking requires each detector to give position information in all three spatial dimensions. It is known that position information along the axis of the detector can be obtained by dividing the outer electrode into segments perpendicular to the detector axis, i.e., along the longitudinal axis. This method is discussed, for example, in the paper by Varnell et al., IEEE Trans. Nucl. Sci. 31, 300 (1984).

SUMMARY OF INVENTION

It is therefore an object of this invention to provide an improved three-axis radiation detection system.

It is a further object of this invention to provide such an improved three-axis radiation detection system which uniquely defines the azimuthal and radial position of a radiation detection event with unsegmented electrodes and can be combined with segmentation in the axial direction to locate events in the longitudinal axes as well.

It is a further object of this invention to provide such an improved radiation detection system in which either one or both of the detection diode electrodes may be segmented in the radially and/or azimuthal directions.

It is a further object of this invention to provide such an improved radiation detection system in which the length of every path between the inner and outer electrodes or at least each such path in each asymmetric sector of the detector diode is different.

It is a further object of this invention to provide such an improved radiation detection system which is more reliable, simple and easier to make and use yet far exceeds the radial and azimuthal resolution obtainable with segmented electrodes.

It is a further object of this invention to provide such an improved radiation detection system which achieves three-dimensional position information with far fewer segments than required by conventional segmented detectors, thus improving both the cost and the reliability of the system.

The invention results from the realization that information on where the radiation impinges on the detector can be obtained more simply, more reliably and less expensively without segmented electrodes using an asymmetric radiation detection system whose inner and outer electrodes are shaped and positioned so that each path between them is a different length whereby the rise time of a pulse derived from a detected radiation event can uniquely define the azimuthal and radial position of the event, and either the outer electrode is divided into a plurality of segments in the longitudinal axial direction or the inner electrode is inclined for locating the axial location of a radiation detection event occurring in the diode.

This invention features an asymmetric radiation detector system including a semiconductor diode having an outer electrode and an inner electrode disposed in the diode at a position in which each shortest path between any point on the inner electrode and the outer electrode has a different length for generating a pulse rise time uniquely representative of the azimuthal and radial location of a radiation detection event occurring in the diode, and the outer electrode is divided into a plurality of segments in the longitudinal axial direction for locating the axial location of a radiation detection event occurring in the diode.

The invention also features an asymmetric radiation detector system including a semiconductor diode including an outer electrode at the outer periphery of the diode, and an inner electrode disposed in the diode at a position in which each shortest path between any point on the inner electrode and the outer electrode has a different length for generating a pulse rise time uniquely representative of the azimuthal and radial location of a radiation detection event occurring in the diode. The inner electrode is inclined relative to the outer electrode for locating the axial position of a radiation detection event occurring in the diode.

In a preferred embodiment the semiconductor diode may be germanium that may be N-type germanium. The outer electrode may be radially and azimuthally unsegmented and continuous; the inner electrode may be hollow, and it may be radially and azimuthally unsegmented and continuous. The inner electrode may be annular in cross-section; the outer electrode may be annular in cross-section. The longitudinal axes of the inner and outer electrodes may be generally parallel, they may be coaxial, they may be eccentric to one another. The outer electrode may be asymmetrical, the inner electrode may be asymmetrical, the inner and outer electrodes may be symmetrical and their axis of symmetry may be unaligned. There may be a pulse analyzing device responsive to the pulse rise time of a pulse for determining the azimuthal and radial portion of the radiation event generating that pulse. The pulse rise time analyzing device may include means for determining the pulse rise time representative of the length of the path of the detection event generated hole electron current propagating between the electrodes which defines the azimuthal position of that event in the diode. The pulse rise time analyzing device may also include means for determining the pulse rise times associated with each of the hole and electron charges generated by a detection event which define the radial position of that event in the diode.

The invention also features an asymmetric radiation detector system including a symmetrical semiconductor diode including an outer electrode correspondingly symmetrical at the outer periphery of the diode and a symmetrical inner electrode disposed in the diode. There is at least one segmentation for separating the diode into a number of asymmetrical sectors. Each shortest path between any point on the inner electrode and the portion of the outer electrode associated with that sector has a different length for generating a rise time uniquely representative of the azimuthal and radial location of a radiation detection event occurring in the diode, and the outer electrode is divided into a plurality of segments in the longitudinal axial direction for locating the axial location of a radiation detection event occurring in the diode.

In a preferred embodiment the semiconductor diode may be germanium and may be N-type germanium. The outer electrode may be radially and azimuthally unsegmented and continuous. The inner electrode may be hollow and it may be radially and azimuthally unsegmented and continuous. The inner electrode may be annular in cross-section as may be the outer electrode. The longitudinal axis of the inner and outer electrodes may be generally parallel. They may be coaxial or they may be eccentric to one another. The system may include a pulse rise time analyzing device responsive to the pulse rise time of a pulse for determining the azimuthal and radial position of the radiation event generating that pulse. The pulse rise time analyzing device may include means for determining the pulse rise time representative of the length of the path of the detection event generated hole electron current propagating between the electrodes which defines the azimuthal position of that event in the diode. The pulse rise time analyzing device may also include means for determining the pulse rise times associated with each of the hole and electron charges generated by a detection event which define the radial position of that event in the diode.

DISCLOSURE OF PREFERRED EMBODIMENT

Other objects, features and advantages will occur to those skilled in the art from the following description of a preferred embodiment and the accompanying drawings, in which:

This invention achieves a three-dimensional detector which detects position in the radial, azimuthal and axial dimensions or axes with far fewer segments than required by conventional segmented detectors, thus improving both the cost and the reliability of the system. The description referring to FIGS. 1–21 relates to the pulse rise time technique for radial and azimuthal detection. The description referring to FIGS. 22 and 23 relates to the combination of axial segmentation with the radial and azimuthal pulse rise time approach to obtain three-axis position information.

Figures 1, 2, 3, 4:
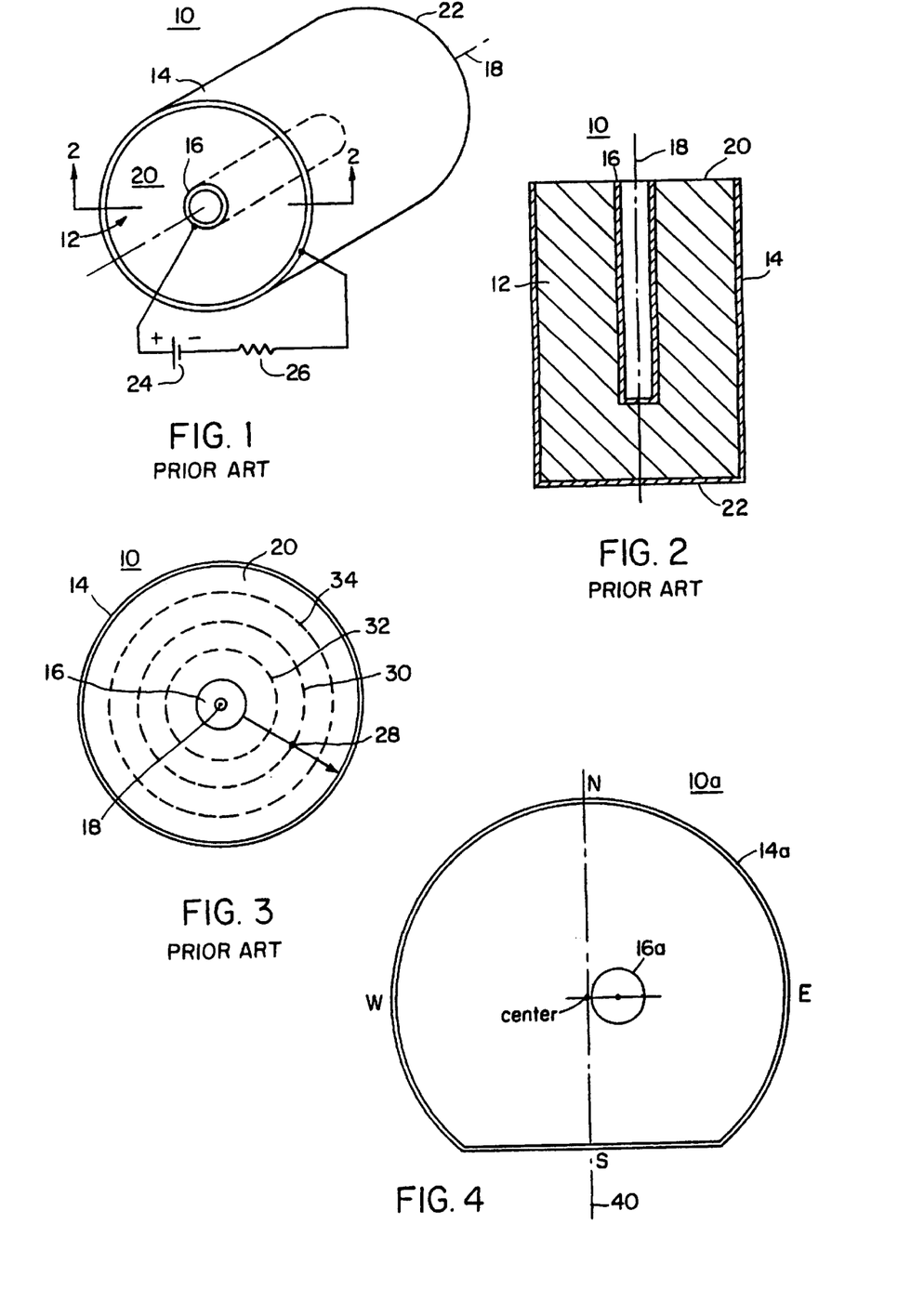
FIG. 1 is a schematic three-dimensional diagram of a prior art radiation detector.
FIG. 2 is a cross-sectional view taken along line 2—2 of FIG. 1.
FIG. 3 is an enlarged schematic view of the face of the detector in FIGS. 1 and 2 illustrating the inability to determine azimuthal position of a detection event without segmented electrodes.
FIG. 4 is a schematic diagrammatic plan view of an asymmetric radiation detector according to this invention in which both the outer and inner electrodes are symmetrical but their axes of symmetry are unaligned.

There is shown in FIG. 1 a prior art radiation detector 10 formed from a cylindrical N-type germanium crystal 12 encased in a cylindrical outer electrode 14 having a centrally located hollow inner electrode 16 which extends axially part of the way through germanium crystal 12 coaxially with longitudinal axis 18 from the face 20 part way to the base 22, FIG. 2. The diode thus formed is back biased by means of battery 24 whose positive terminal is connected to inner electrode 16 and whose negative terminal is connected through load resistor 26 to outer electrode 14.

As can be seen in FIG. 3, where face 20 has been shown schematically and enlarged and electrode 16 has been shown solid instead of hollow, these prior art detectors are capable of determining where radially a detection event has occurred. For example, a detection event 28 which occurred at point 28 can be distinguished from one occurring at radius 30, 34 at the inner or outer electrodes 16 and 14. However, no information on the azimuthal position of event 28 can be obtained in such prior art devices unless the inner or outer electrodes are segmented. For example, if outer electrode 14 were divided into two segments, then event 28 could be determined to have occurred in one half or the other of detector 10. If there were four segments then a determination could be made as to in which of the four quarters it occurred azimuthally. If there were thirty-two sectors a determination could be made as to in which 32nd of the detector the event occurred. And of course the construction and testing of these segments, as well as all the additional complex circuitry associated with them, adds to the time, labor and cost required to make such devices.

A detector can be made to provide both radial and azimuthal position without segmentation of the electrodes by defining the shape and position of the two electrodes so that the shortest path between any point on one electrode and the other electrode has a different length so that a pulse is generated whose rise time uniquely represents the azimuthal and radial location of a radiation event occurring within the diode. For example, detector 10a according to this invention may have a symmetrical outer electrode 14a and symmetrical inner electrode 16a, but the axis of symmetry 40 of outer electrode 14a aligns with no axis of symmetry of the circular inner electrode 16a. Circular inner electrode 16a has an axis of symmetry defined by each and every of its diameters. Because of this construction, a path between any point of inner electrode 16a directly to outer electrode 14a will be different in length than any other such path. As will be shown, this enables pulse rise times to uniquely define azimuthal and radial positions.

Figure 5:
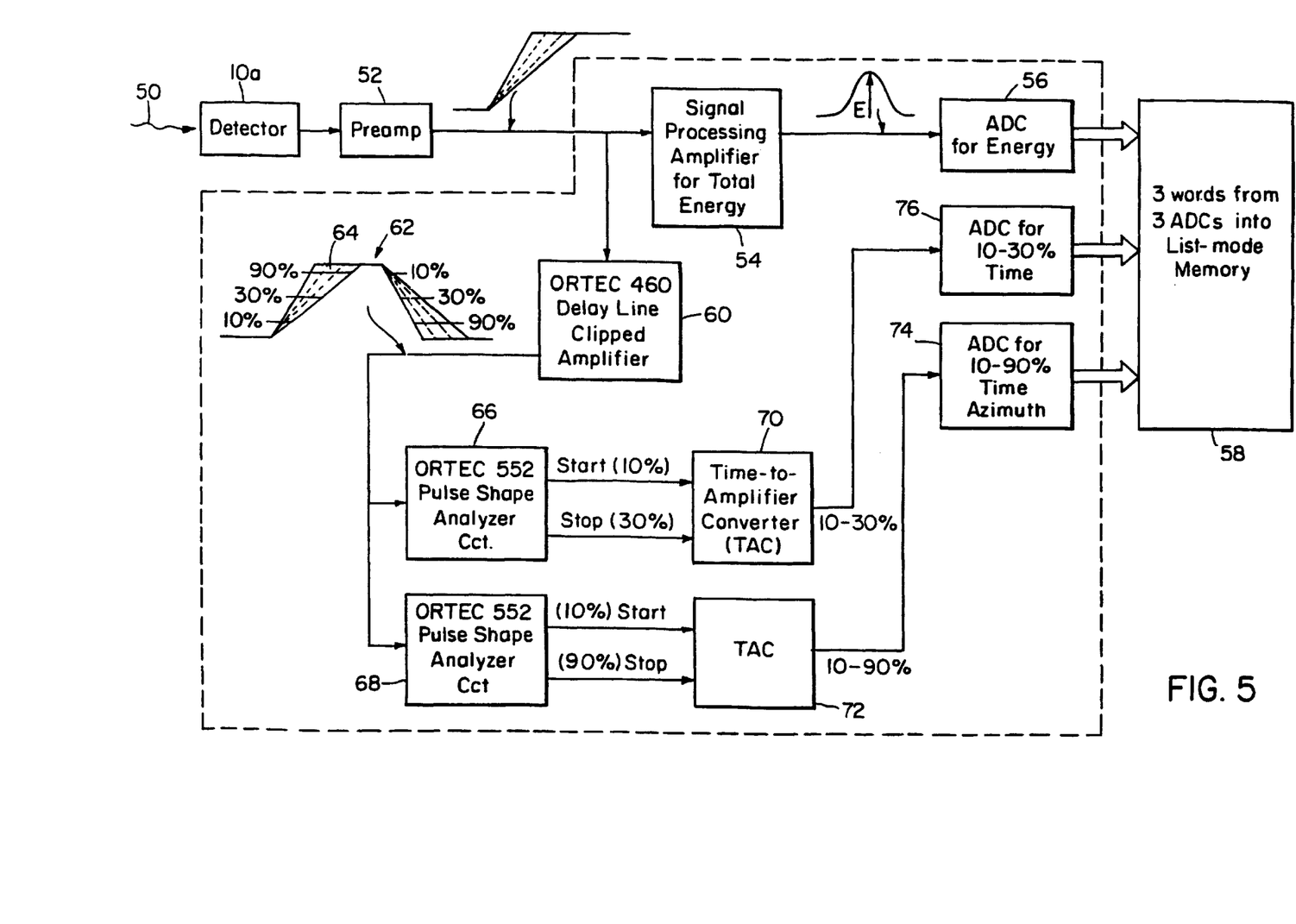
FIG. 5 is a schematic block diagram of an asymmetric radiation detector system according to this invention which determines the energy, azimuthal and radial position of a detection event detected by the detector.

Detector 10a, FIG. 5, receives gamma ray radiation 50, for example, and delivers an analog signal representative thereof to preamplifier 52 which in turn delivers that signal to a signal processing amplifier 54 that provides a signal representing the total energy E to analog to digital converter 56 for further delivery to list mode memory 58. The same signal is delivered to delay line clipped amplifier 60 such as in an EG&G ORTEC 460 made by EG&G ORTEC Corporation of Oak Ridge, Tenn. There the input signal from preamp 52 is delayed and subtracted from the original undelayed signals, and it provides an output pulse 62 which displays the rise times 64 of the input pulse from preamplifier 52. Pulse 62 is provided to two pulse shape analyzers 66 and 68 which may be implemented with an EG&G ORTEC 552 circuit from EG&G ORTEC, Inc. of Oak Ridge, Tenn. The pulse shape analyzers work on the well known principle of constant fraction timing on the trailing edges of the pulses supplied by the MOD 460 amplifiers. This principle is explained in the instruction manual of the 552. Pulse shape analyzer circuit 66 samples the rise times at 10% and 30% and submits them to time to amplitude converter 70 which provides an amplitude representative of the rise time between 10% and 30%. Pulse shape analyzer circuit 68 performs in the same way but instead samples 10% and 90% points which are delivered to time to amplitude converter 72 that provides an output whose amplitude represents the rise time from 10% to 90%. The 10–90% rise time is converted by analog to digital converter 74 to a digital signal for indicating the azimuthal position of the detected event. The output from time to amplitude converter 74 representing the 10–30% rise time is provided to analog to digital converter 76 which provides a digital output representing the 10–30% rise time. The 10–30% rise time from ADC 76 and the 10–90% rise time from ADC 74 are used to determine the radial position of the detection event. Thus list mode memory stores three words from the three ADCs 56, 74 and 76 which represent the energy in the pulse and the radial and azimuthal position of the pulse representative of a radiation detection event sensed by detector 10a. More sophisticated electronic processing can be implemented to employ the full information inherent in the pulse shape.

Figure 6:
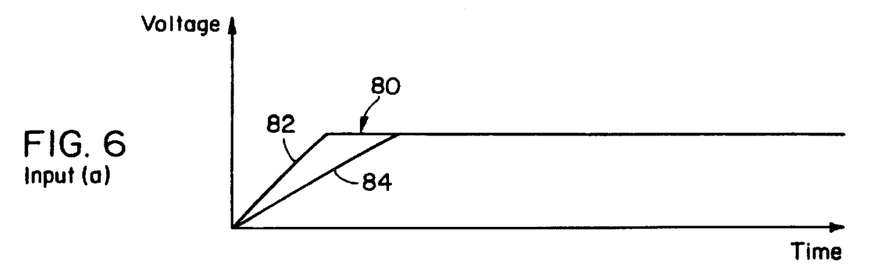
FIG. 6 illustrates input pulses which are input to the system.
Figure 7:
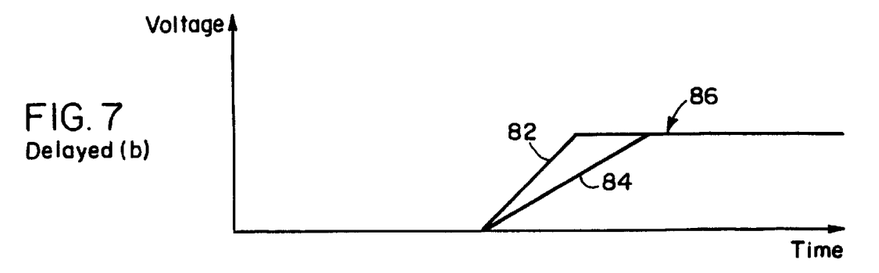
FIG. 7 is a view of the pulse of FIG. 6 after it has been delayed.
Figure 8:
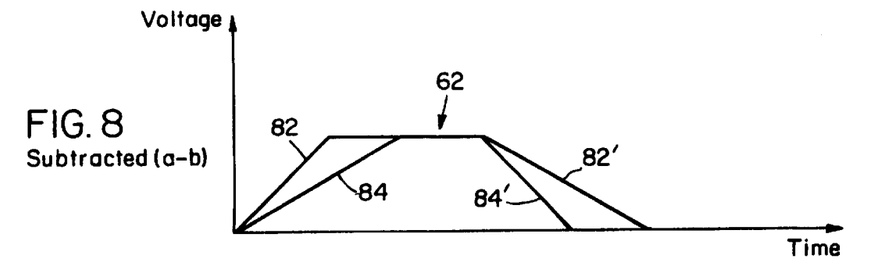
FIG. 8 illustrates the result of subtracting the delayed pulse in FIG. 7 from the input pulse in FIG. 6.
Figure 9:
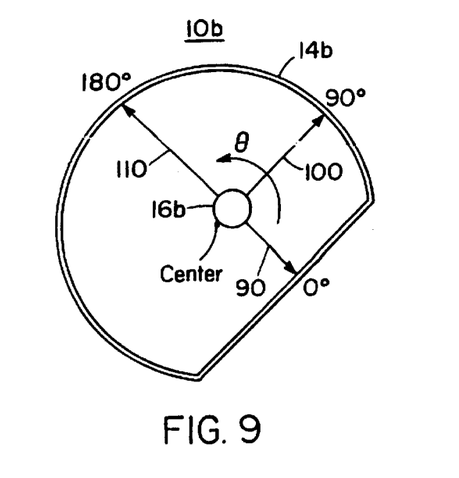
FIG. 9 is a view of a detector face similar to FIG. 4 showing various azimuthal angles θ from 0–180°.
Figure 10:
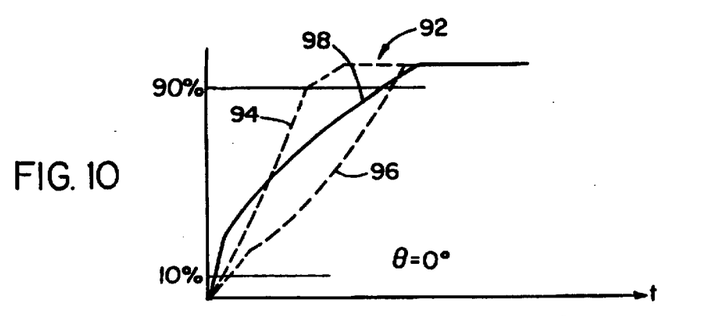
FIG. 10 illustrates a pulse rise time which occurs in the azimuthal position along the 0° radius.
Figure 11:
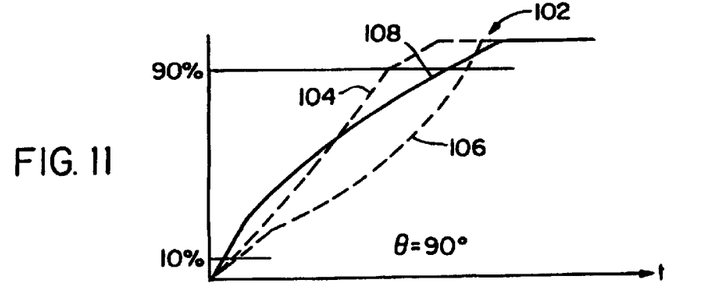
FIG. 11 is a view similar to FIG. 10 where a pulse rise time indicates an azimuthal position along the 90° radius.
Figure 12:
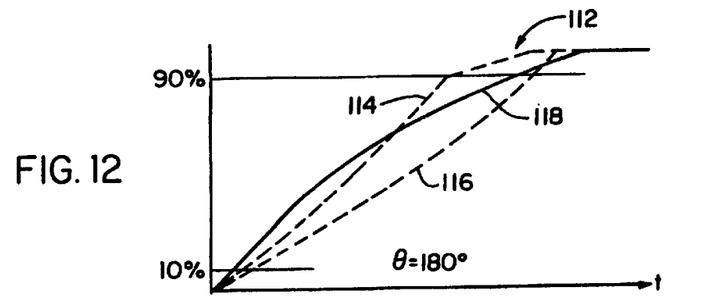
FIG. 12 is a view similar to FIGS. 10 and 11 where the pulse rise time indicates an azimuthal position along the 180° radius.

The generation of pulse 62 by delay line clipped amplifier 60, FIG. 5, is shown in FIGS. 6, 7 and 8, where the input to delay line clipped amplifier 60 appears as pulse 80 having a range of rise times 82–84. Pulse 80 delayed, i.e., pulse 86, having the same range of rise times 82–84, FIG. 6, is developed in delay line clipped amplifier 60 as shown in FIG. 7. Delayed input pulse 86 having the same range of rise times 82–84 is developed in delay line clipped amplifier 60 and subtracted from the undelayed input signal 80 to produce output pulse 62, FIG. 8, having the same rise time range 82–84 and the mirror image fall time 82'–84' The use of the rise times to obtain azimuthal position is demonstrated with respect to FIGS. 9–12. For example, the detector 10b, FIG. 9, having outer electrode 14b and inner electrode 16b, will produce a pulse whose rise time depends upon the length of the path travelled between the inner and outer electrode by the charge generated by the radiation event. For example, an event occurring along the zero radius 90, FIG. 9, will typically produce a pulse 92, FIG. 10, that has a range of rise times from a minimum 94 to a maximum 96. Thus a rise time detected by virtue of the samples at the 10% and 90% points, such as rise time 98, falls within that range and defines a position along the zero radius. For an event that occurred along the 90° radius 100, FIG. 9, a pulse such as pulse 102, FIG. 11, may be generated which has a minimum 104 and maximum 105 range of rise times so that a rise time 108 determined by samples taken at the 10% and 90% points falls within that range and indicates an azimuthal position along the 90° radius. An event occurring along the 180° radius 110, FIG. 9, will produce a pulse 112, FIG. 12, having minimum and maximum rise times 114, 116 so that a pulse having a rise time 118 defined by the sample points taken at 10% and 90% represents a pulse occurring azimuthally somewhere along 180° radius 110.

The radial position or the position of the event along the radius can be determined by comparing the 30% and 90% points. For example, assume detector 10c, FIG. 13, has detected events A, B and C occurring along a radius 120, where event A is halfway between electrode 16c and electrode 14c, event C occurs closer to the outer electrode 14c, and event B occurs closer to the inner electrode 16c. Holes generated by an event travel outwardly to electrode 14c which is biased negatively, and electrons flow inwardly toward electrode 16c which is biased positively.

Figure 13:
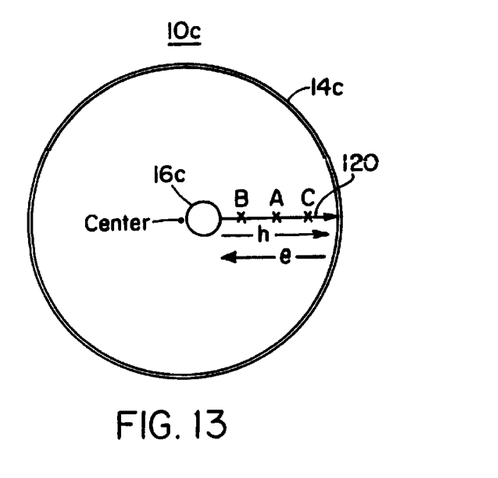
FIG. 13 is view of a radiation detector according to this invention similar to that shown in FIGS. 4 and 9 illustrating the detection of events at three different radial distances A, B and C between the inner and outer electrode.
Figure 14:
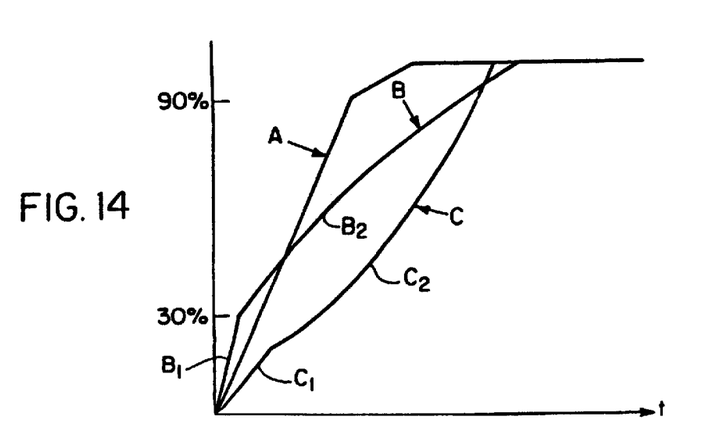
FIG. 14 illustrates the waveform of pulses whose rise times vary in accordance with the radial position of the occurrence of the events A, B and C.
Figure 15:
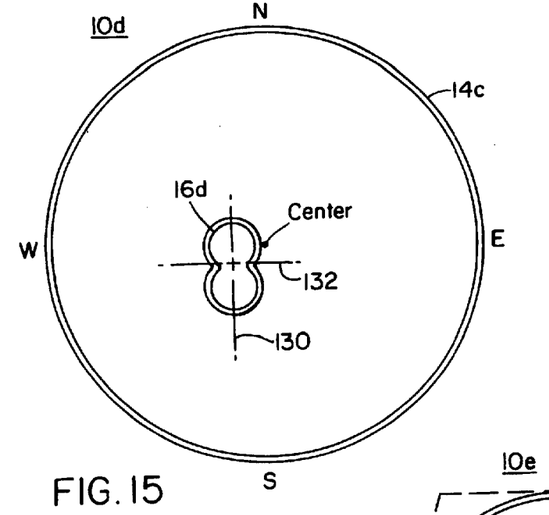
FIG. 15 is a schematic plan view of the face of a radial detector according to this invention hang another geometry in which both the inner and outer electrodes are symmetrical but whose axes of symmetry are unaligned.

Upon the occurrence of an event A, the holes generated there need travel only half the distance between electrodes 16c and 14c, from A to outer electrode 14c. Likewise, the electrons need only travel half the distance, from event point A to inner electrode 16c. Thus the electrons and holes will be collected and form a current in one half the full travel time and the rise time is the shortest possible reflected as rise time A in FIG. 14. In comparison, an event occurring at B closer to inner electrode 16c would provide a fast rise time $B_1$ while the electrons make the short path from B to inner electrode 16c but then has a much slower rise time $B_2$ while the holes travel the longer distance from event point B to outer electrode 14c, providing a composite rise time B. Conversely, an event occurring at point C will enable the holes to be collected quickly, producing fast rise time $C_1$ but then produce a slower rise time $C_2$ while the electrons travel the farther distance from event point C to inner electrode 16c to produce the composite rise time C. Note that the nonlinear rise times and the differences in shape between pulses B and C are due to the coaxial geometry of the detector.

Figure 16:
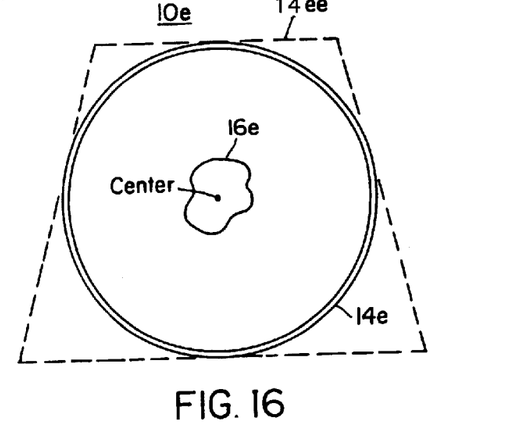
FIG. 16 is a view similar to FIG. 15 in which the inner electrode is asymmetrical and the outer electrode is symmetrical.
Figure 17:
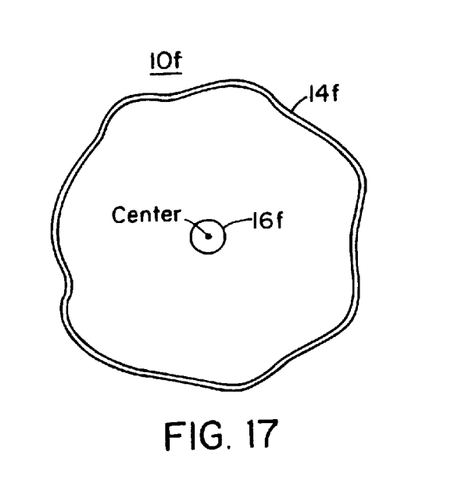
FIG. 17 is a view similar to FIGS. 15 and 16 in which the outer electrode is asymmetrical and the inner electrode is symmetrical.
Figure 18:
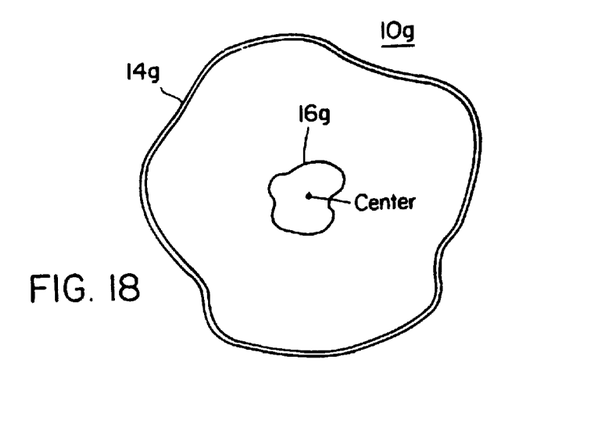
FIG. 18 is a view similar to FIGS. 15–17 in which the inner and outer electrodes are asymmetrical.
Figure 19:
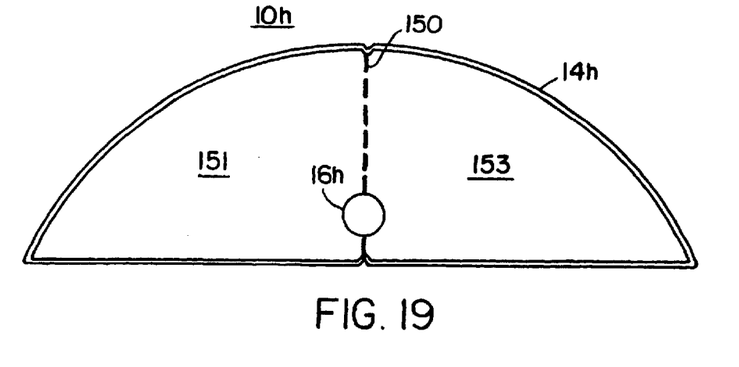
FIG. 19 is a view similar to FIGS. 15–18 in which both the inner and outer electrode are symmetrical and a segmentation is used to divide it into two asymmetrical sectors in accordance with this invention.
Figure 20:
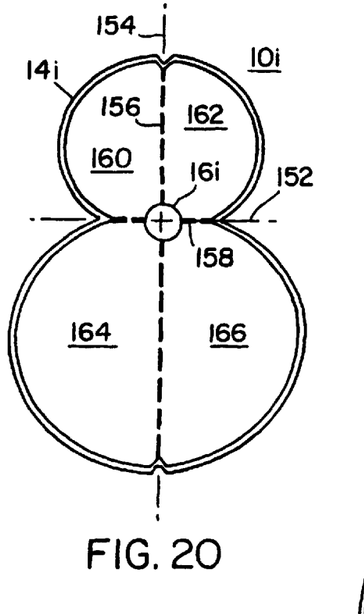
FIG. 20 is a view similar to FIG. 19 in which there are two axes of symmetries and two segmentations are used to divide the diode into four asymmetric sectors.
Figure 21:
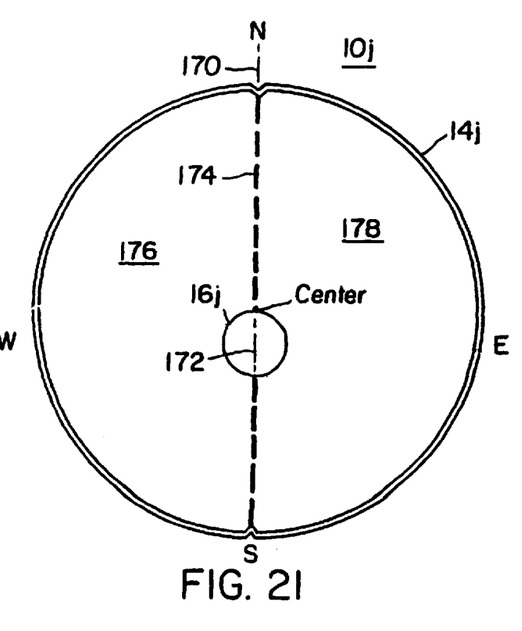
FIG. 21 is a view similar to FIGS. 19 and 20 in which the inner and outer electrodes are symmetrical and their axes of symmetries are aligned and segmentation on the inner or outer contact is used to divide the diode into two asymmetrical sectors.
Figure 22:
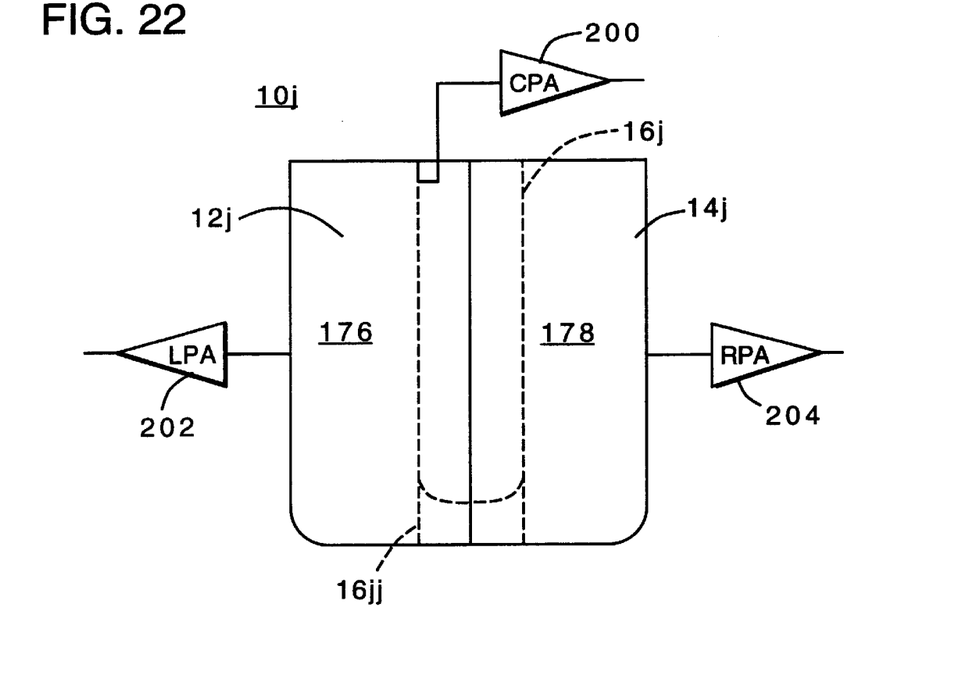
FIG. 22 is a side elevational view of the detector of FIG. 21 without axial segmentation and using three preamplifiers.

A variety of combinations of symmetrical inner and outer electrodes with their axis of symmetry unaligned and various combinations of asymmetrical and symmetrical inner and outer electrodes may be employed to obtain the desired construction which provides the shortest path between any point on the inner electrode and the outer electrode such that each such path has a different length. For example, in FIG. 15 detector 10d has a circular and thus symmetrical outer electrode 14c and a symmetrical inner electrode 16d, but neither of the axes of symmetry 130, 132, of inner electrode 16d is aligned with any axis of symmetry of outer electrode 14c. In FIG. 16 inner electrode 16e is asymmetrical but outer electrode 14e is circular and symmetrical. The outer electrode could also be a trapezoid 14ee, shown in phantom. In FIG. 17, inner electrode 16f is a symmetrical circular shape while outer electrode 14f is an irregular asymmetrical shape. In FIG. 18 both the inner 16g and outer 14g electrodes are asymmetrical. FIG. 19 illustrates a detector 10h which has a symmetrical outer electrode 14h and inner electrode 16h but has been segmented by an insulating, isolating element 150 which divides the diode and outer electrode 14h into two sectors 151, 153, each of which is asymmetric and in each of which the shortest path between any point on the inner electrode and the outer electrode has a different length. A similar adaptation is made in FIG. 20, where inner electrode 16i is symmetrical and outer electrode 14i is symmetrical about two axes 152 and 154 so that two electrically isolating segments, barriers or elements 156 and 158 are provided to provide four asymmetrical sectors 160, 162, 164 and 166, in each of which the shortest path between any point on the inner electrode and the outer electrode has a different length. In FIG. 21, detector 10j has a circular outer electrode 14j and a circular inner electrode 16*j* that have mutual aligned symmetrical axes 170, 172 so that segmentation 174 such as, for example, an electrically isolating barrier element is provided to divide the area into two asymmetric sectors 176 and 178 to support the determination of azimuthal and radial positions in accordance with this invention. Inner electrodes 16*a–j* may be solid or hollow or tubular.

The asymmetric detector 10*j*, FIG. 21, has two external segments which effectively create two asymmetrical detectors 176, 178. The preamplifier CPA 200, FIG. 22, connected to the central electrode 16*j*, measures the total charge. If the photon interacts in the left half 176 of the detector, signals will be produced in preamplifiers CPA 200 and LPA 202. If the photon interacts in the right half 178 of the detector, signals will be produced in preamplifier CPA 200 and RPA 204. Analysis of the risetime of the signals produced by preamplifiers 202 or 204 gives the position information as described previously. The analysis of the risetime of preamplifier 200 gives the same information in this case, with the existence of a signal from the left or right preamplifiers 202, 204 removing the ambiguity of the information from the central preamplifier.

Although thus far the detectors have been shown with center electrodes which do not extend all the way through, this is not a necessary limitation of the invention. For example, a double open ended or true coaxial structure could be employed by simply extending the center electrode all the way through the detector as shown at 16*jj*, FIG. 22.

Figure 23:
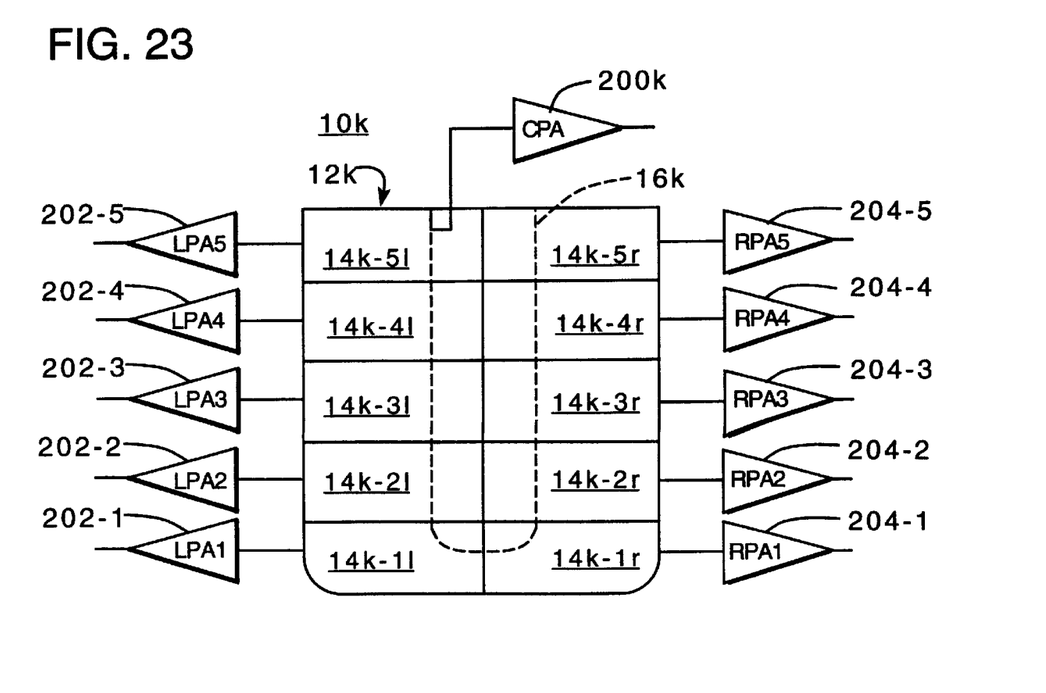
FIG. 23 is a view similar to FIG. 22 of a detector according to this invention with the outer electrode divided into five axial segments.

In accordance with this invention the same detector design is further segmented, FIG. 23, along the detector axis into five axial segments each about one centimeter thick. A single preamplifier 200*k* is connected to the central electrode 16*k* and measures the total charge. A separate preamplifier 202-1 to 202-5 and 204-1 to 204-5 is connected to the left and right sides, respectively, of each of the five axial segments.

A typical result of a 1 MeV photon losing all of its energy in detector 10*k* would result in three interactions in crystal 12*k*. Since the average distance between interactions 8 is about the thickness of each axial segment, it is likely that the three interactions will occur in three different axial segments. Suppose the interactions occur in the left side segment 14*k*-1*l*, the right side, segment 14*k*-2*r* and the right side, segment 14*k*-5*r*. The total charge can be measured in preamplifier 200*k*. Only preamplifiers 202-1, 204-2 and 204-5 will produce signals. Analysis of the rise time of preamplifier 202-1 will yield the axial position of segment 14*k*-1*l* interaction. Analysis of the rise time of preamplifier 204-2 will yield the axial position of the segment 14*k*-2*r* interaction. Analysis of the rise time of preamplifier 204-5 will yield the axial position of segment 14*k*-5*r* interaction. The three dimensional position of each of the three interactions and the total energy of the photon are thus determined.

If two interactions occur in the same half segment only one signal will be produced. The position information produced will give the energy-weighted average of the two interactions. Increasing the number of axial segments will reduce the probability of such occurrences but increase the cost of the detector and electronics.

The left and right segment preamplifiers produce signals proportional to the total energy deposited in their half-segment. If desired, the energy of each interaction can thus be measured in addition to the position.

Figure 24:
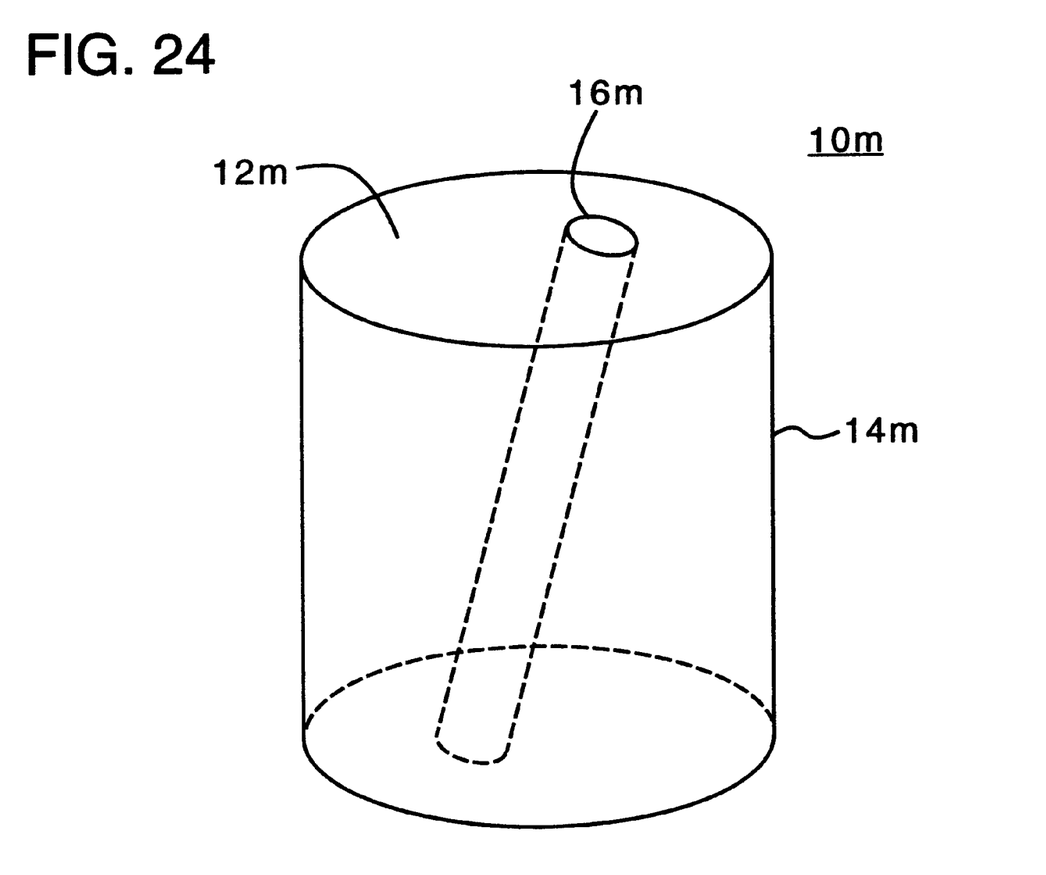
FIG. 24 is three-dimensional diagrammatic view of another detector construction according to this invention.

Although the asymmetric configuration that enables each shortest path between any point on the inner electrode and the outer electrode to have a different length is effected so far by eccentrically positioning the inner electrode, this is not a necessary limitation of the invention. For the inner electrode may be inclined as shown at 16*m* in FIG. 24. In such a construction the inclined inner electrode 16*m* also serves to locate the axial position of a radiation detection event without additional axial segmentation as shown in FIG. 23.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An asymmetric radiation detector system comprising:
 a semiconductor diode including an outer electrode at the outer periphery of said diode, said outer electrode being divided into a plurality of segments in the longitudinal axial direction for locating the axial location of a radiation detection event occurring in said diode; and
 an inner electrode disposed in said diode at a position in which each shortest path between any point on the inner electrode and the outer electrode has a different length for generating a pulse rise time uniquely representative of the azimuthal and radial location of a radiation detection event occurring in said diode.

2. The asymmetric radiation detector system of claim 1 in which said semiconductor diode is germanium.

3. The asymmetric radiation detector system of claim 1 in which said semiconductor diode is either N type or P type germanium.

4. The asymmetric radiation detector system of claim 1 in which said outer electrode is radially and azimuthally unsegmented and continuous.

5. The asymmetric radiation detector system of claim 1 in which said inner electrode is hollow.

6. The asymmetric radiation detector system of claim 5 in which said inner electrode is radially and azimuthally unsegmented and continuous.

7. The asymmetric radiation detector system of claim 5 in which said inner electrode is annular in cross-section.

8. The asymmetric radiation detector system of claim 1 in which said outer electrode is annular in cross-section.

9. The asymmetric radiation detector system of claim 1 in which the longitudinal axes of said inner and outer electrodes are generally parallel.

10. The asymmetric radiation detector system of claim 9 in which said inner and outer electrodes are coaxial.

11. The asymmetric radiation detector system of claim 8 in which said inner and outer electrodes are eccentric to one another.

12. The asymmetric radiation detector system of claim 1 in which said outer electrode is asymmetrical.

13. The asymmetric radiation detector system of claim 1 in which said inner electrode is asymmetrical.

14. The asymmetric radiation detector system of claim 1 in which said inner and outer electrodes are symmetrical and their axes of symmetry are unaligned.

15. The asymmetric radiation detector system of claim 1 further including a pulse rise time analyzing device responsive to the pulse rise time of a pulse for determining the azimuthal and radial position of the radiation event generating that pulse.

16. The asymmetric radiation detector system of claim 15 in which said pulse rise time analyzing device includes means for determining the pulse rise time representative of the length of the path of the detection event generated hole-electron current between said electrodes which defines the azimuthal position of that event in the diode.

17. The asymmetric radiation detector system of claim 15 in which said pulse rise time analyzing device includes means for determining the pulse rise times associated with each of the hole and electron charges generated by a detection event which define the radial position of that event in the diode.

18. An asymmetric radiation detection system comprising:
- a symmetrical semiconductor diode including an outer electrode correspondingly symmetrical at the outer periphery of said diode, said outer electrode being divided into a plurality of segments in the longitudinal axial direction for locating the axial location of a radiation detection event occurring in said diode;
- a symmetrical inner electrode disposed in said diode;
- at least one segmentation for separating said diode into a number of asymmetrical sectors, each shortest path between any point on the inner electrode and the outer electrode associated with that sector having a different length for generating a pulse rise time uniquely representative of the azimuthal and radial location of a radiation detection event occurring in said diode.

19. The asymmetric radiation detector system of claim 18 in which said semiconductor diode is germanium.

20. The asymmetric radiation detector system of claim 18 in which said semiconductor diode is either N type or P type germanium.

21. The asymmetric radiation detector system of claim 18 in which said outer electrode is radially and azimuthally unsegmented and continuous.

22. The asymmetric radiation detector system of claim 18 in which said inner electrode is hollow.

23. The asymmetric radiation detector system of claim 18 in which said inner electrode is radially and azimuthally unsegmented and continuous.

24. The asymmetric radiation detector system of claim 18 in which said inner electrode is annular in cross-section.

25. The asymmetric radiation detector system of claim 18 in which said outer electrode is annular in cross-section.

26. The asymmetric radiation detector system of claim 18 in which the longitudinal axes of said inner and outer electrodes are generally parallel.

27. The asymmetric radiation detector system of claim 26 in which said inner and outer electrodes are coaxial.

28. The asymmetric radiation detector system of claim 18 in which said inner and outer electrodes are eccentric to one another.

29. The asymmetric radiation detector system of claim 18 further including a pulse rise time analyzing device responsive to the pulse rise time of a pulse for determining the azimuthal and radial position of the radiation event generating that pulse.

30. The asymmetric radiation detector system of claim 29 in which said pulse rise time analyzing device includes means for determining the pulse rise time representative of the length of the path of the detection event generated hole-electron current between said electrodes which defines the azimuthal position of that event in the diode.

31. The asymmetric radiation detector system of claim 29 in which said pulse rise time analyzing device includes means for determining the pulse rise times associated with each of the hole and electron charges generated by a detection event which define the radial position of that event in the diode.

32. The asymmetric radiation detector system of claim 31 in which said inner electrode extends all the way through said outer electrode.

33. An asymmetric radiation detector system comprising:
- a semiconductor diode including an outer electrode at the outer periphery of said diode; and
- an inner electrode disposed in said diode at a position in which each shortest path between any point on the inner electrode and the outer electrode has a different length for generating a pulse rise time uniquely representative of the azimuthal and radial location of a radiation detection event occurring in said diode, said inner electrode being inclined relative to said outer electrode for locating the axial location of a radiation detection event occurring in said diode.

34. The asymmetric radiation detector system of claim 33 in which said semiconductor diode is germanium.

35. The asymmetric radiation detector system of claim 33 in which said semiconductor diode is either N type or P type germanium.

36. The asymmetric radiation detector system of claim 33 in which said outer electrode is radially and azimuthally unsegmented and continuous.

37. The asymmetric radiation detector system of claim 33 in which said inner electrode is hollow.

38. The asymmetric radiation detector system of claim 37 in which said inner electrode is radially and azimuthally unsegmented and continuous.

39. The asymmetric radiation detector system of claim 37 in which said inner electrode is annular in cross-section.

40. The asymmetric radiation detector system of claim 33 in which said outer electrode is annular in cross-section.

41. The asymmetric radiation detector system of claim 33 in which the longitudinal axes of said inner and outer electrodes are generally inclined to each other.

42. The asymmetric radiation detector system of claim 40 in which said inner and outer electrodes are eccentric to one another.

43. The asymmetric radiation detector system of claim 33 in which said outer electrode is asymmetrical.

44. The asymmetric radiation detector system of claim 33 in which said inner electrode is asymmetrical.

45. The asymmetric radiation detector system of claim 33 in which said inner and outer electrodes are symmetrical and their axes of symmetry are unaligned.

46. The asymmetric radiation detector system of claim 33 further including a pulse rise time analyzing device responsive to the pulse rise time of a pulse for determining the azimuthal and radial position of the radiation event generating that pulse.

47. The asymmetric radiation detector system of claim 45 in which said pulse rise time analyzing device includes means for determining the pulse rise time representative of the length of the path of the detection event generated hole-electron current between said electrodes which defines the azimuthal position of that event in the diode.

48. The asymmetric radiation detector system of claim 45 in which said pulse rise time analyzing device includes means for determining the pulse rise times associated with each of the hole and electron charges generated by a detection event which define the radial position of that event in the diode.

* * * * *